(12) United States Patent
Sayko

(10) Patent No.: US 6,418,210 B1
(45) Date of Patent: Jul. 9, 2002

(54) METHOD AND APPARATUS FOR PROVIDING INFORMATION BETWEEN A CALLING NETWORK AND A CALLED NETWORK

(75) Inventor: Robert J. Sayko, Colts Neck, NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/450,304

(22) Filed: Nov. 29, 1999

(51) Int. Cl.7 .......................... H04M 1/56; H04M 15/06
(52) U.S. Cl. .............................. 379/142.15; 379/93.23; 379/142.06; 379/207.15; 379/245
(58) Field of Search ........................... 379/88.19–88.21, 379/93.23, 142.01, 142.06, 142.15, 127.01, 207.014–207.15, 245; 455/415

(56) References Cited

U.S. PATENT DOCUMENTS 5,724,412 A * 3/1998 Srinivasan 6,295,341 B1 * 9/2001 Muller

* cited by examiner

Primary Examiner—Duc Nguyen

(57) ABSTRACT

A gateway interface device that can be provided with a buffer for temporarily storing a calling party's information which can be sent with the initial signaling message of a calling party on an IP network to establish a communication with a called party on a PSTN network. Subsequent to the receipt of the initial signaling message, and based on the calling party's stored information, the gateway interface can intercept a request for calling party information from the called party or a called party's end office. Once the request for calling party information is received by the gateway interface, the gateway interface can then generate a reply based on the calling party information stored in the buffer. Otherwise, the calling party information stored in the buffer can be removed from the buffer after a predetermined period of time.

17 Claims, 3 Drawing Sheets

| CALL ID | CALLING ID | CALLED ID | CALLING INFORMATION | ELAPSED TIME |
|---|---|---|---|---|
| 15 | 12 | 127 | USER 1, (202)555-2345 | 11 SEC. |
| 27 | 14 | 43 | USER 2, (703)55-5678 | 7 SEC. |
| 34 | 28 | 98 | USER 3, (401)555-9876 | 14 SEC. |
| 37 | 13 | 178 | USER 7, (703)555-1234 | 5 SEC. |
| 56 | 131 | 17 | USER 9, (612)555-0981 | 2 SEC. |
| ⋮ | ⋮ | ⋮ | ⋮ | ⋮ |

METHOD AND APPARATUS FOR PROVIDING INFORMATION BETWEEN A CALLING NETWORK AND A CALLED NETWORK

BACKGROUND OF THE INVENTION

1. Field of Invention

The invention relates to a method and system that provides information between a calling network and a called network.

2. Description of Related Art

Presently, when a call is placed over a public switched network (PSTN) using a signaling protocol, such as switched network SS7 signaling protocol developed by AT&T, a called party having specialized equipment can receive and view information of a calling party, such as the calling party's name. To accomplish this, when the end office of the called party receives a call request signal to set up a call, the called party's end office can examine the called party's features to determine if information, such as calling name (CNAM) for caller ID, is required to establish a connection. If so, then the called party's end office can generate and transmit a transaction capabilities application part (TCAP) message back to the calling party's end office to request calling party information.

In response, the calling party's end office, which can have access to the calling party information, will generate and transmit a reply to the called party's end office. The reply will include a TCAP message which contains the requested information. Additionally, the calling party's end office may charge the called party's end office a fee for the delivery of the information.

Currently, Internet Protocol (IP) networks are being used for telephony services in the new and developing IP telephony services. In the IP network architectures, communications can be established from one network element of the IP network to another under the control of a network controller, such as a gateway controller in a distributed IP architecture (i.e., DCS) or a call agent (CA) in a centralized architecture (i.e., NCS). Various signaling protocols are being used between network elements but the PSTN protocols, such as SS7, do not function on such networks and therefore are not used.

In order for an IP communication network to operate with a PSTN network, a gateway interface element is employed between the networks. The gateway interface translates the signaling protocols and also converts the data streams appropriately between the networks. Accordingly, the gateway interface permits establishment of communications originating from an IP network terminal with a called terminal connected with the PSTN network, and vice versa.

While establishing a call from an IP network terminal to a PSTN network terminal, an initial call request is transmitted across the IP network to the gateway interface. The gateway interface receives the initial call request which typically contains call information, such as the identifier of the called party along with an identifier of the calling party. While the IP protocol can include the calling party information in the initial request, the PSTN signaling protocol may not. Therefore, the gateway interface will translate the initial call request into a PSTN signaling protocol which does not include the calling party information and transmit the call request to the appropriate called PSTN network terminal.

SUMMARY OF THE INVENTION

In accordance with the present invention, the gateway interface copies a portion of the initial call request, such as the calling party information, and stores the calling party information in a buffer. During the initial setup of the communication and for a defined period of time thereafter, the buffer retains the calling party information. If during the initial setup or shortly thereafter, the called terminal or PSTN network requests the calling party information, the called terminal or PSTN network transmits a request to the calling IP network terminal for the calling party information. As the request for the calling party information is transmitted back to the IP network, the request is intercepted by the gateway interface and a response can be generated and sent back to the requesting PSTN network terminal based on the caller information stored in the buffer.

By temporarily storing the call information of the IP terminal, the gateway interface can reduce the burden on the IP network and IP network terminal, since it is no longer required to transmit redundant call information. Additionally, by not requiring the IP terminal to respond to a request for additional information, the gateway interface conserves the IP network and terminal resources which are now available to perform other tasks. Furthermore, the gateway interface alleviates the need for requiring a SS7 protocol from end to end of a PSTN network in order to exchange call information, such as the call name.

In accordance with the present invention, the gateway interface can be provided with a buffer for temporarily storing the calling party's information. The calling party's information can be initially sent with the call request signaling message of a calling party on an IP network to establish a communication with the called party on the PSTN network. Subsequently, based on the calling party's stored information, the gateway interface can intercept a request for calling party information from the called party or called party's end office, such as the calling party's name. If a request for calling party information is received by the gateway interface, then the gateway interface generates a reply based on the calling party information stored in the buffer. The calling party information stored in the buffer is removed from the buffer after a predetermined period of time.

BRIEF DESCRIPTION OF THE DRAWINGS

The invention will be described with reference to the accompanied drawings, wherein like numerals reference like elements, and wherein:

FIG. 3 is an exemplary data structure for storing parameters related to a calling party in the buffer of FIG. 1.

DETAILED DESCRIPTION OF PREFERRED EMBODIMENTS

Figure 1:
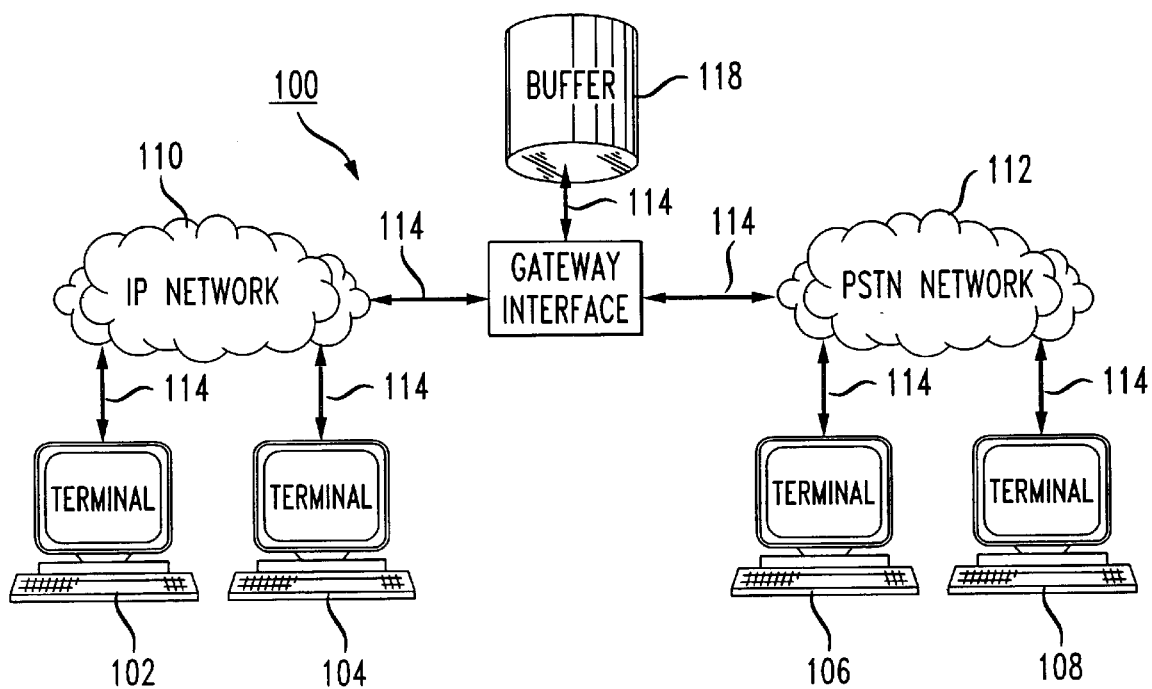
FIG. 1 is a block diagram of an exemplary caller information delivery system in accordance with the present invention.

FIG. 1 shows an exemplary block diagram of a calling party information delivery system 100 in accordance with the invention. The system 100 includes a plurality of terminals 102–108 in communication with either an Internet protocol (IP) network 110 or a public switched network (PSTN) 112, via wired or wireless communication links 114. Terminals 102–108 can be devices of any type that allow for the transmission and/or reception of communication signals. For example, the terminals 102–108 can be land-line telephones, end offices, cellular telephones, computers, personal digital assistants, video telephones, video conference apparatus, smart or computer-assisted televisions, Web TV and the like. For the purposes of the following description of the present invention, it will be assumed that terminals 102–108 are telephones.

The networks 110, 112 may be a single network or a plurality of networks of the same or different types. For example, PSTN network 112 may include a local telephone network (such as a Bell Atlantic telephone network) in connection with a long-distance network (such as an AT&T long-distance telephone network). Furthermore, the IP network 110 may be a single data network or a plurality of data networks. It is to be understood that network 110 and network 112 can be any combination of networks may be used without departing from the spirit and scope of the present invention. However, for the purposes of discussion, it will be assumed that network 110 is a single data IP network and PSTN network 112 is a single telecommunications network.

The terminals 102–108 are in communication with the IP network 110 and PSTN network 112 over communication links 114. These communication links 114 may be any type of connection that allows for the transmission of information. Some examples include conventional telephone lines, fiber optic lines, direct serial/parallel connections, wireless cellular telephone or satellite communication links, local area networks (LANs), intranets and the like.

The calling party information delivery system 100 includes a gateway interface 116 interconnected between the IP network 110 and the PSTN network 112. The gateway interface 116 typically perform translation of networking signaling protocols and conversion of data transmissions (e.g., digitally encoded speech of a phone call) passing between the IP network 110 and the PSTN network 112. While the gateway interface 116 is shown as an independent unit coupled between the respective networks 110, 112, it can also be incorporated into the terminals 102–108, or may be distributed throughout either the IP network 110 or the PSTN network 112 or both. Any configuration that permits translation of network signaling protocols and conversion of data between networks 110, 112 can be used without departing from the spirit and scope of the present invention.

The calling party information delivery system 100 further includes a buffer 118 connected with the gateway interface 116 via a communication link 114. Under the direction of the gateway interface 116, the buffer 118 temporarily stores calling party information, such as a calling party's name. The calling party information stored in the buffer 118 can later be used by the gateway interface 116 to respond to a request of the PSTN network terminals 106–108 for calling party information of the IP network terminal 102–104. While shown connected with the gateway interface 116, it is to be understood that the buffer 118 may be included in the gateway interface IP network 110, PSTN network 112, or terminals 102–108, or in a distributive manner within numerous elements without departing from the spirit and scope of the present invention.

Figure 2:
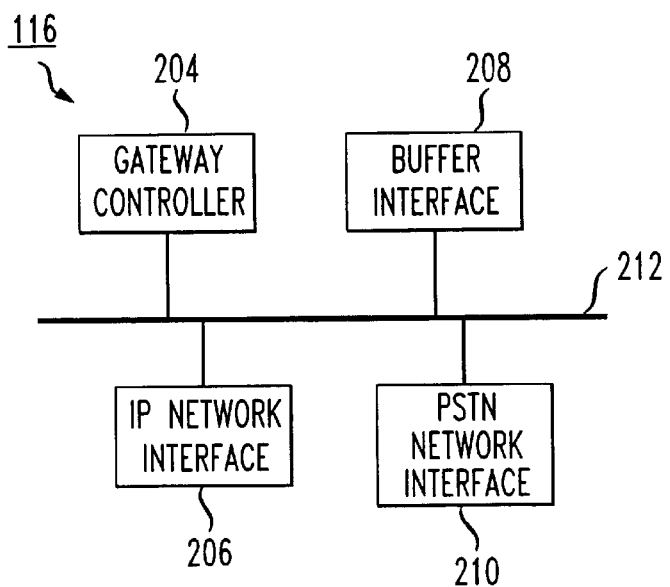
FIG. 2 is an exemplary block diagram of the gateway interface device of FIG. 1.

FIG. 2 shows an exemplary block diagram of a gateway interface 116 of FIG. 1. The gateway interface 116 includes a gateway controller 204, a IP network interface 206 (which can further include an IP network Signaling Interface, and an IP network Media Interface), a buffer interface 208, and a PSTN network interface 210 (which can further include a PSTN network Media Interface and a PSTN network Signaling Interface). The above components are coupled together via control/data bus 212. The above architecture is exemplary only. Other architectures of the components may be used without departing from the spirit and scope of the present invention.

In operation, the gateway controller 204 manages the communications between the IP network 110 and the PSTN network 112 via the IP network interface 206 and the PSTN network interface 210, respectively. The gateway controller 204 translates information passing between the communication protocols of the IP network 110 and the PSTN network 112. For example, the gateway controller 204 will translate PSTN signaling protocols, such as SS7, into IP protocols, such as H.323, Packet Cable DCS, Packet Cable NCS, MGCP, and vice versa. Furthermore, the gateway controller 204 will convert the various data transmissions between the respective networks 110, 112. For example, the gateway controller 204 will convert data transmissions from an analog or digitally encoded PSTN format to a G.711 or G.728 and encode the data transmission into an IP format.

The gateway controller 204 can access the buffer 118 via buffer interface 208. The gateway controller 204 uses the buffer 118 to store calling party information for later retrieval by the gateway controller 204 and supplied to a requesting network 110, 112 as needed.

In operation, when a call is placed from an IP network terminal 102–104 to one of the PSTN network terminals 106–108, a call request is transmitted across the IP network 110 to the gateway interface 116. The gateway interface 116 receives the call request from the IP network 110 that typically contains call information, such as the identifier of the called party along with an identifier of the calling party. While the IP protocol can include the calling party information in the initial request, the PSTN signaling protocol may not. Therefore, the gateway controller 204 must translate the call request into a PSTN signaling protocol which does not include the calling party information and transmit the call across the PSTN network 112 to the appropriate one of the called PSTN network terminal 106–108 and/or end office. Additionally, the gateway controller 204 will typically copy a portion of the initial call request, such as the calling party information, and store the calling party information in the buffer 118 via buffer interface 208.

During the initial setup of the communication and for a defined period of time thereafter, the buffer 118 retains the calling party information. If during the initial setup or shortly thereafter, the called terminal or PSTN network 112 requests the calling party information, the called terminal or PSTN network 112 can transmit a request, such as a TCAP message, to the appropriate one of the calling IP network terminals 102–104 for the calling party information. As the request for the calling party information is transmitted back to the IP network 110, the request is intercepted by the gateway controller 204 and a response can be generated and sent back to the requesting PSTN network terminal 104–108 based on the caller information stored in buffer 118.

FIG. 3 shows an exemplary data structure 300 for storing call information in the buffer 118. The field 302 contains a call identifier. The call identifier can be any numeric, alphanumeric, or the like identifier which uniquely identifies a call placed between the IP network 110 and the PSTN network 112. For example, as shown in field 302, calls corresponding to call ID's 15, 27, 34, 37, and 56 are currently stored in buffer 118 which represents calls placed between the networks 110 and 112.

Fields 304 and 306 contain the calling terminal and called terminal identifiers, respectively. The calling and called terminal identifiers fields 304 and 306 contain the terminal ID's of the terminals 102–108 corresponding to the call identifier in field 302. As shown, the calling parties using terminals 102–108 corresponding to the terminal ID 12 and terminal ID 127 are currently participating in a communication identified by the call ID 15. In addition to the call ID in field 302, the calling terminal and called terminal ID's in field 304 and 306, respectively, can be used by the gateway controller 204 to identify communications between the IP network 110 and the PSTN network 112.

Field 308 contains the calling terminal information. As described above, the calling terminal information may include information about the calling party, such as the calling party's name, the calling party's phone number, the calling party's IP address, or the like. The calling terminal information in field 308 corresponds to the call identifier in field 302. For example, caller ID 37 has calling terminal information of "user 7, (703) 555-1234".

Field 310 contains an elapsed time for which calling party information has been stored in the buffer 118. For example, the calling party information corresponding to call ID 15 has been stored in the buffer for eleven seconds. The elapsed time in field 310 may be used to delete calling party information from the buffer 118 in order to conserve memory storing resources. For example, information may be removed from the buffer 118 when the elapsed time in field 310 exceeds a predetermined time limit. The predetermined time limit may be a time which has been selected and that exceeds the useful life of the information stored in the buffer 118. For example, the predetermined limit may be 15 seconds, which has been determined to be the maximum elapsed time that the calling party information remains likely to be requested. Accordingly, none of the information stored in buffer 118 will be stored beyond a 15-second time limit.

As an example of operation, it is assumed that the calling terminal 102 using IP network 110 wants to establish a communication with the called terminal 108 on PSTN network 112. A request for communication is generated by the calling terminal 102 and transmitted across the IP network 110 to the gateway interface 116. The request will typically contain a calling terminal ID, a called terminal ID, calling party information, and the like which may be necessary to establish the communication.

Upon receiving the request, the gateway interface 116 translates the request from an IP protocol into a PSTN protocol and convert the corresponding data between formats. As described above, the IP protocol request may contain more information than the PSTN protocol request, and therefore a portion of the IP information may be left out of the PSTN protocol request. Therefore, the gateway interface 116 copies the information left out of the IP protocol request and stores the information in buffer 118 along with a corresponding call identifier. Assume, as shown in the exemplary data structure 300, that the gateway interface 116 has copied and stored the information pertaining to the call under call ID 37. The gateway interface 116 has also copied and stored the calling and called IDs, 13, 178, which correspond to the calling and called terminals 102, 108 in fields 304, 306, respectively. Furthermore, the gateway interface 116 has copied and stored the calling party's information in the calling terminal information field 308.

As the request to establish a communication is transferred from the gateway interface 116 to the PSTN network 112 and ultimately to the called terminal 108, the PSTN network 112 or the called terminal 108 may request calling party information from the calling party prior to or concurrent with the establishment of the communication. The information requested may be generated by either the PSTN network 112 or the called terminal 108 and transmitted back to the calling terminal 102.

As the information requested is received by the gateway interface 116, the gateway interface 116 examines the transmission to determine if the transmission is a request for calling party information of the calling terminal. The gateway interface 116 typically determines whether the transmission is an information request from a calling party terminal by matching the call ID, calling ID, or called ID field with the information contained in the transmission. If the transmission is an information request for a calling terminal, the gateway interface 116 intercepts the information request and generates a reply to the request based on the calling party information stored in the buffer. The request is then sent to the PSTN network 112 or the called ID terminal 108.

In this example, once the gateway interface 116 receives the information request, the gateway interface 116 can compare the information of the request with the calling party information stored in the buffer 118.

Assuming that the information requested is for the calling party's name and based on the match with the call ID 37, the gateway interface 116 can generate a reply to the request which includes the calling party's name "User 7" which is copied from field 308 of the data structure 300. Once generated, the reply may then be sent to the called terminal 108 or the PSTN network 112 to establish a proper communication.

Furthermore, as described above, once the information has been used by the gateway interface 116, it can then be removed from the buffer. Additionally, if the elapsed time in field 310 reaches and/or exceeds a predetermined time limit, the data may be removed from or overwritten on the buffer 118.

Figure 4:
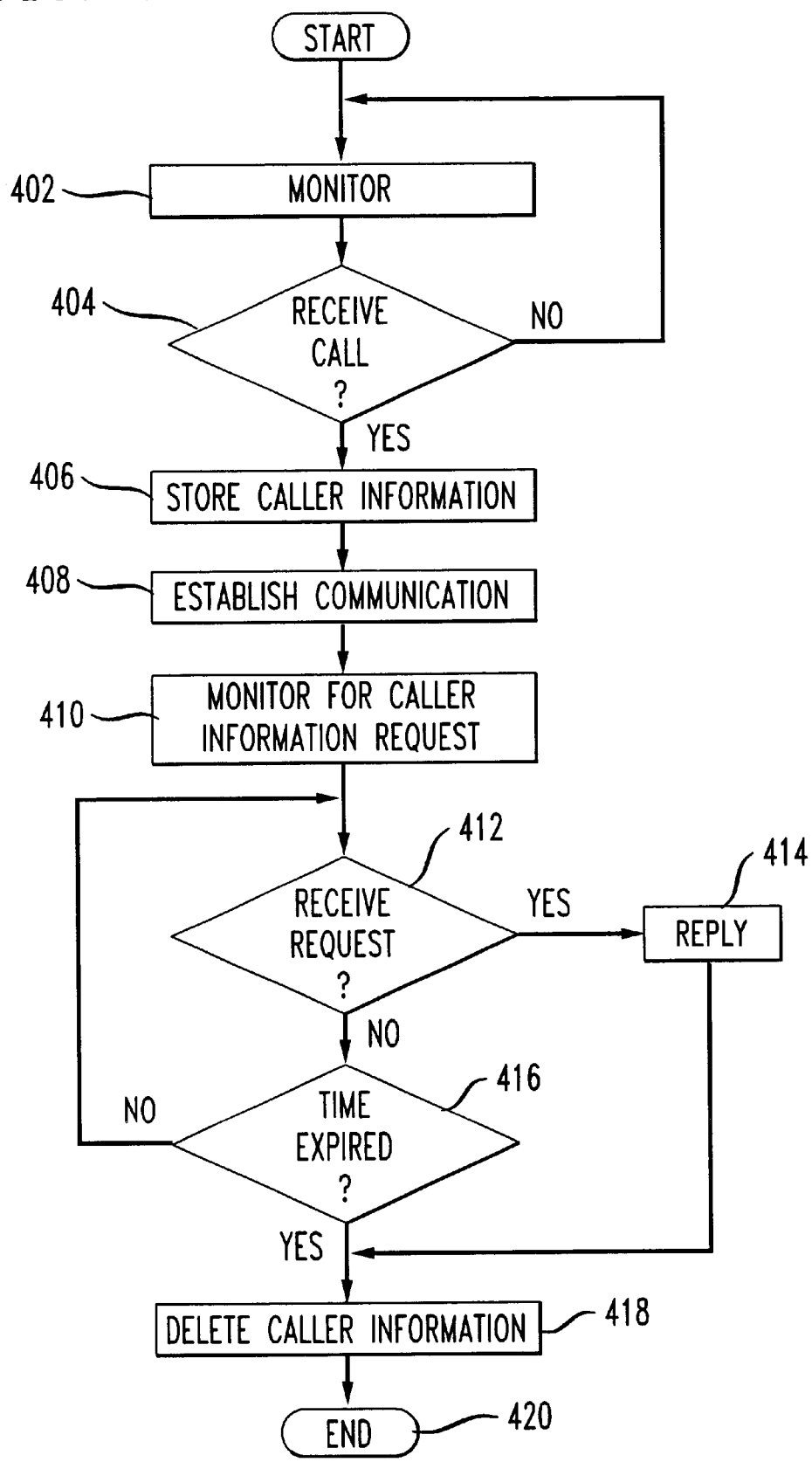
FIG. 4 is a flowchart outlining an exemplary process of the gateway interface in accordance with the present invention.

FIG. 4 shows a flowchart of an exemplary process performed by a gateway interface. In step 402 communications between an IP network and a PSTN network are monitored to determine if a communication is to be established between the respective networks.

In step 404 the gateway interface, such as gateway interface 116, checks to see if a communication has been attempted. If a communication is currently being placed between the networks, then the process execution proceeds to step 406; otherwise process execution returns to step 402 during which time the interface continues to monitor communications.

In step 406, the gateway interface examines the call request and extracts caller information from the call request and stores the caller information in a buffer. Next in step 408, a communication is established between a calling terminal and a called terminal.

In step 410, the gateway interface monitors the called terminal to determine if a request for caller information has been transmitted. The request for caller information may occur simultaneously with the setup of the communication, or shortly thereafter.

In step 412 the gateway interface determines whether a request for caller information has been received. If such a request has been received, the process execution proceeds to step 414 wherein the interface generates a reply based on the stored caller information and transmits the reply to the requesting called terminal; otherwise, the process execution proceeds to step 416 where the process determines if a predetermined time limit has expired.

If the time limit has expired in step 416, the process execution proceeds to step 418; otherwise, the process returns to step 412. In step 418 the process deletes the caller information from temporary storage device and proceeds to step 420 where the process ends.

As shown in FIG. 2, the gateway interface, which executes the method of this invention, comprises a programmed processor, such as a general purpose or a special purpose computer, a programmed microprocessor or microcontroller and peripheral integrated circuit elements, an Application Specific Integrated Circuit (ASIC) or other integrated hardware electronic or logic circuit such as a discreet element circuit, a programmable logic device such as a PLD, PLA, FPGA, or PAL, or the like. In general, any device which resides on a finite state machine capable of implementing the flowchart shown in FIG. 4 can be used to implement the gateway interface 116 functions of this invention.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the present invention.

What is claimed is:

1. A method of providing call information about a calling terminal to a called terminal, comprising:

monitoring a connection between a first network and a second network;

receiving a request to establish communications from the calling terminal of the first network to the called terminal of the second network;

temporarily storing the call information of the calling terminal of the first network, the call information being included in the request to establish the communication;

establishing communications between the called terminal of the second network and the calling terminal of the first network; and replying to a request from the called terminal of the second network for the call information of the calling terminal of the first network based on the stored call information of the calling terminal.

2. The method according to claim 1, wherein the step of establishing communications between the first network and the second network includes translating the communications between the first and second networks via a gateway interface.

3. The method according to claim 2, wherein the call information is temporarily stored in a memory of the gateway interface.

4. The method according to claim 3, wherein the call information is removed from the memory when a predetermined amount of time has elapsed.

5. The method according to claim 1, further comprising:
deleting the call information of the calling terminal of the first network after replying to the request or after a predetermined amount of time has elapsed.

6. The method according to claim 1, wherein the call information of the calling terminal includes at least a calling name.

7. The method according to claim 6, wherein the call information of the calling terminal further includes at least one of a telephone number, terminal identifier, or IP address.

8. The method according to claim 1, wherein the first network is an Internet protocol network and the second network is a public switched network.

9. The method according to claim 1, wherein the first network uses a communication protocol that is different from a communication protocol of the second network.

10. The method according to claim 1, wherein the call information is gathered from the request for communication between the first network to the second network.

11. An apparatus that provides caller information to a called terminal, comprising:

a memory that stores call information; and a gateway controller connected with a first network, a second network and said memory, said controller (1) monitoring a connection between the first network and the second network, (2) receiving a request to establish a communication from a calling terminal of the first network to the called terminal of the second network, stores call information of the calling terminal of the first network in said memory, the call information being included in the request to establish the communication, (3) establishing the communication between the called terminal of the second network and the calling terminal of the first network, and (4) replying to a request from the second terminal of the second network for the call information of the calling terminal of the first network based on the stored call information of the calling terminal.

12. The apparatus according to claim 11, wherein the gateway controller translates the communications between the first and second networks.

13. The apparatus according to claim 11, wherein the gateway controller deletes the call information of the calling terminal of the first network after replying to the request for the call information of the calling terminal of the first network, or after a predetermined amount of time has elapsed.

14. The apparatus according to claim 11, wherein the call information of the calling terminal includes at least a calling name.

15. The apparatus according to claim 14, wherein the call information of the calling terminal further includes at least one of a telephone number, terminal identifier, or IP address.

16. The apparatus according to claim 11, wherein the first network is an Internet protocol network and the second network is a public switched network.

17. The apparatus according to claim 11, wherein the first network uses a communication protocol that is different from a communication protocol of the second network.

* * * * *